(12) United States Patent
Hayashi et al.

(10) Patent No.: US 8,539,755 B2
(45) Date of Patent: Sep. 24, 2013

(54) EXHAUST PURIFICATION DEVICE OF INTERNAL COMBUSTION ENGINE

(75) Inventors: Kotaro Hayashi, Mishima (JP); Tetsuya Yamashita, Gotenba (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 320 days.

(21) Appl. No.: 13/054,684

(22) PCT Filed: Jul. 24, 2009

(86) PCT No.: PCT/JP2009/063630
§ 371 (c)(1),
(2), (4) Date: Jan. 18, 2011

(87) PCT Pub. No.: WO2010/010973
PCT Pub. Date: Jan. 28, 2010

(65) Prior Publication Data
US 2011/0162354 A1 Jul. 7, 2011

(30) Foreign Application Priority Data
Jul. 25, 2008 (JP) ................................ 2008-192625

(51) Int. Cl.
*F01N 3/00* (2006.01)
*B01D 46/00* (2006.01)
*F02B 77/04* (2006.01)
*F02M 25/00* (2006.01)
*F02M 35/02* (2006.01)

(52) U.S. Cl.
USPC .................. 60/276; 55/309; 55/312; 95/279; 123/198 E (58) Field of Classification Search
USPC ................ 60/276; 123/198 E; 55/309, 312, 55/385.3; 95/278–280
See application file for complete search history.

(56) References Cited

U.S. PATENT DOCUMENTS

| 6,280,493 B1 * | 8/2001 | Eubank ........................... 55/398 |
| 2004/0013579 A1 * | 1/2004 | Schaller ....................... 422/171 |
| 2006/0070364 A1 | 4/2006 | Reamsnyder et al. |

FOREIGN PATENT DOCUMENTS

| JP | 5-126993 A | | 5/1993 |
| JP | 07-001791 A | | 1/1995 |
| JP | 07-259654 A | | 10/1995 |
| JP | 07259654 A | * | 10/1995 |
| JP | 10-238330 A | | 9/1998 |
| JP | 3249051 B | | 11/2001 |
| JP | 2004-204232 A | | 7/2004 |
| JP | 2004-301121 A | | 10/2004 |
| JP | 2007-211605 A | | 8/2007 |

* cited by examiner

*Primary Examiner* — Kenneth Bomberg
*Assistant Examiner* — Audrey K Bradley
(74) *Attorney, Agent, or Firm* — Kenyon & Kenyon LLP (57) ABSTRACT

Particles smaller than 50 nanometers emitted from an internal combustion engine, and serving as nuclei for forming PM (particulate matter), are removed to decrease the number of PM particles that are emitted to atmosphere. High efficiency filters are provided in passages that feed fluids into the combustion chamber, e.g., intake air, fuel and engine oil, in order to remove particles smaller than 50 nanometers serving as nuclei for forming PM.

6 Claims, 8 Drawing Sheets

EXHAUST PURIFICATION DEVICE OF INTERNAL COMBUSTION ENGINE

This is a 371 national phase application of PCT/JP2009/063630 filed 24 Jul. 2009, which claims priority to Japanese Patent Application No. 2008-192625 filed 25 Jul. 2008, the contents of which are incorporated herein by reference.

TECHNICAL FIELD

This invention relates to a device for purifying exhaust gas of internal combustion engines.

BACKGROUND ART

Due to improved combustion, the amount of PM (particulate matter) in exhaust gas emitted from modern internal combustion engines has greatly decreased. However, PM emission standards are becoming more stringent requiring a further decrease in the number of emitted PM particles larger than 50 nanometers.

In this case, a DPF (diesel particulate filter), etc., is installed in the exhaust gas passage of an internal combustion engine. However, depending upon the operating conditions of the internal combustion engine, installation of a DPF often does not satisfy PM emission standards.

However, regarding the formation of PM in an internal combustion engine, it has been known that fine particles contained in the fluid, e.g., intake air, fuel, engine oil, etc., fed into the combustion chamber of the internal combustion engine, serve as nuclei accelerating the formation of PM. That is, even if particles in the fluid fed into the combustion chamber are smaller than 50 nanometers, they serve as nuclei in the combustion chamber and become PM particles larger than 50 nanometers, which cannot satisfy the requirement of emission standards of PM particles.

In order to further decrease emission of PM, it is necessary to decrease particles smaller than 50 nanometers contained in the fluid that is fed into the combustion chamber of an internal combustion engine.

However, in conventional devices for purifying exhaust gas of internal combustion engines, means for decreasing the emission of PM is based on improving the combustion in the internal combustion engine and treating the exhaust gas. There is no prior example of decreasing the number of PM by preventing particles smaller than 50 nanometers that serve as nuclei of PM from entering into the combustion chamber.

For example, the filters disclosed in JP-A-2004-301121 and Japanese Patent No. 3249051 are traditional air filters for filtering relatively large solid matter (sizes on the order of microns) from the intake air for protecting the internal combustion engine, while the filter disclosed in JP-A-10-238330 is for removing contaminating substances for the exhaust gas emitted from the crankcase. Although all of these filters are described as high efficiency filters, they do not remove particles smaller than 50 nanometers that serve as nuclei of PM.

SUMMARY OF INVENTION

JP-A-5-126993 discloses an exhaust device introducing an HEPA filter (high efficiency particulate air filter) used in a facility for treating nuclear fuel. However, the HEPA filter of JP-A-5-126993, traps particles of down to several microns, and removes solid particulate radioactive matter contained in the exhaust air from the nuclear fuel facility, but does not decrease the number of PM particles by removing particles smaller than 50 nanometer that serve as nuclei of PM.

The object of the present invention is to decrease the number of PM particles emitted from an internal combustion engine, by removing particles smaller than 50 nanometers from the fluid fed to the combustion chamber of the engine, which serve as nuclei of PM.

According to the present invention, a device for purifying exhaust gas of an internal combustion engine, comprising at least one high efficiency filter arranged in at least one passage for feeding at least one fluid into the combustion chamber to remove fine particles smaller than 50 nanometers that serve as nuclei for forming PM, wherein the fine particles smaller than 50 nanometers are removed to decrease the number of PM particles emitted from the internal combustion engine is provided.

That is, in the present invention, the high efficiency filter for removing particles smaller than 50 nanometers is arranged in the passage for feeding the fluid into the combustion chamber to thereby remove particles smaller than 50 nanometers that serve as nuclei of PM, in order to prevent the formation of PM larger than 50 nanometers in the exhaust gas caused by the nuclei, and enable the number of the emitted PM particles to be decreased.

In the above, it is preferable that the at least one fluid fed into the combustion chamber, when at least one high efficiency filter is arranged in the passage to the combustion chamber, is the intake air.

That is, upon arranging the high efficiency filter for removing particles smaller than 50 nanometers in the passage for feeding the intake air into the combustion chamber, particles smaller than 50 nanometers that serve as nuclei of PM are removed and the number of the emitted PM particles can be decreased.

It is also preferable that the at least one fluid fed into the combustion chamber, when at least one high efficiency filter is arranged in the passage to the combustion chamber, is a fuel to be combusted in the combustion chamber.

That is, upon arranging the high efficiency filter for removing particles smaller than 50 nanometers in the passage for feeding the fuel into the combustion chamber, particles smaller than 50 nanometers that serve as nuclei of PM are removed and the number of the emitted PM particles can be decreased.

It is also preferable that the at least one fluid fed into the combustion chamber, when at least one high efficiency filter is arranged in the passage to the combustion chamber, is engine oil.

That is, upon arranging the high efficiency filter for removing particles smaller than 50 nanometers in the passage for feeding the engine oil into the combustion chamber, particles smaller than 50 nanometers that serve as nuclei of PM are removed and the number of the emitted PM particles can be decreased.

In the invention, further, provision is made of at least one by-pass that by-passes the at least one high efficiency filter; and valve means for controlling the change-over of the flow of the fluid into the at least one high efficiency filter and the flow of the fluid into the at least one by-pass, wherein the number of the emitted PM particles is calculated depending upon the operating conditions of the internal combustion engine to control the fluid, when the calculated number of the PM particles exceeds a predetermined value, to pass through the high efficiency filter, and when the calculated number of the PM particles is smaller than the predetermined value, to pass through the by-pass.

That is, provision is made of the high efficiency filter and the by-pass that by-passes it, and the flow is changed over by the valve means depending upon the operating conditions of the internal combustion engine. The operation is conducted passing through the high efficiency filter only when it is necessary. Therefore, during the entire operation period, the operation is conducted by maintaining a high efficiency engine operation with little pressure loss of the fluid.

Further, in the invention, provision is made of at least one by-pass that by-passes the at least one high efficiency filter; and valve means for controlling the change-over of the flow of the fluid into the at least one high efficiency filter, the flow of the fluid into the at least one by-pass and the flow of the fluid backward to the at least one high efficiency filter, wherein the number of the emitted PM particles is calculated depending upon the operating conditions of the internal combustion engine to control the fluid, when the calculated number of the PM particles exceeds a predetermined value, to pass through the high efficiency filter, when the calculated number of the PM particles is smaller than the predetermined value, to decide if the operating conditions are for forming the PM to control the fluid, when the PM is formed, to pass through the by-pass, and when the PM is not formed, to flow backward through the high efficiency filter to clean the high efficiency filter.

That is, the fluid is flown backward to the high efficiency filter to conduct the operation for cleaning the high efficiency filter. Thus, the filtering performance of the high efficiency filter can be maintained for extended periods of time.

In the above, the number of the PM particles emitted depending upon the operating conditions is calculated and when the calculated number of the PM particles exceeds a predetermined value, the fluid is controlled to pass through the high efficiency filter. However, it is, also allowable to find a correlation between the operating conditions and the number of the emitted PM particles in advance through experiments and to hold the correlation as, for example, an operation map. When it is estimated from the operation map that the operating condition is such that the number of the emitted PM particles exceeds a predetermined value, the flow of fluid is controlled to pass through the high efficiency filter. Such conditions correspond to, for example, light-load operating conditions. In such a case, it is advantageous to control the fluid passing through the high efficiency filter.

Further, it is, preferable that at least one high efficiency filter is arranged downstream of an ordinary filter.

That is, the fluid is, first, passed through the ordinary filter to remove relatively large particles as a preliminary step of passing the fluid through the high efficiency filter for removing fine particles smaller than 50 nanometers. This prevents the high efficiency filter from being loaded at an early time, prevents an increase in the pressure loss and prevents the high efficiency filter from losing its filtering performance.

According to the present invention as described above, particles smaller than 50 nanometers that serve as nuclei of PM are removed to decrease the number of the emitted PM particles.

DESCRIPTION OF EMBODIMENTS

Embodiments of the invention will now be described with reference to the accompanying drawings. In a plurality of the accompanying drawings, the same or corresponding members are denoted by the same reference numerals.

Figure 2:
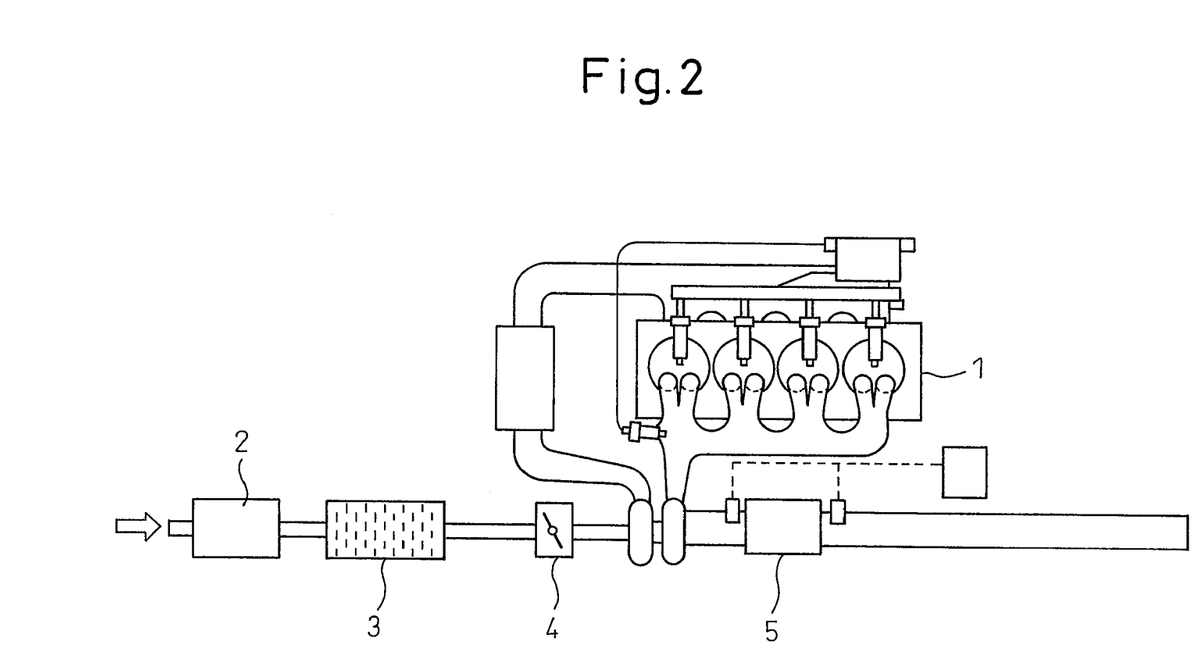
FIG. 2 is a schematic view illustrating the constitution of another embodiment of when the invention is applied to the device for purifying exhaust gas of an internal combustion engine.

FIG. 2 illustrates a basic embodiment of the invention in which a HEPA filter 3 (high efficiency particulate air filter) for removing fine particles smaller than 50 nanometers (hereinafter referred to as "fine particles of nano-sizes") is arranged downstream of an ordinary air filter 2 which is for filtering the intake air. That is, in order to decrease the PM that generates in the combustion chamber of an internal combustion engine 1, nano-sized particles that serve as nuclei of PM are removed by the HEPA filter 3. In this case, it is preferable that relatively large solid matter that may hinder the mechanical motion of the internal combustion engine are filtered by the ordinary air filter before the intake air flows into the HEPA filter 3, and that the HEPA filter 3 removes the particles of nano-sizes only so that the filtering performance of the HEPA filter 3 is not hindered.

Figure 1:
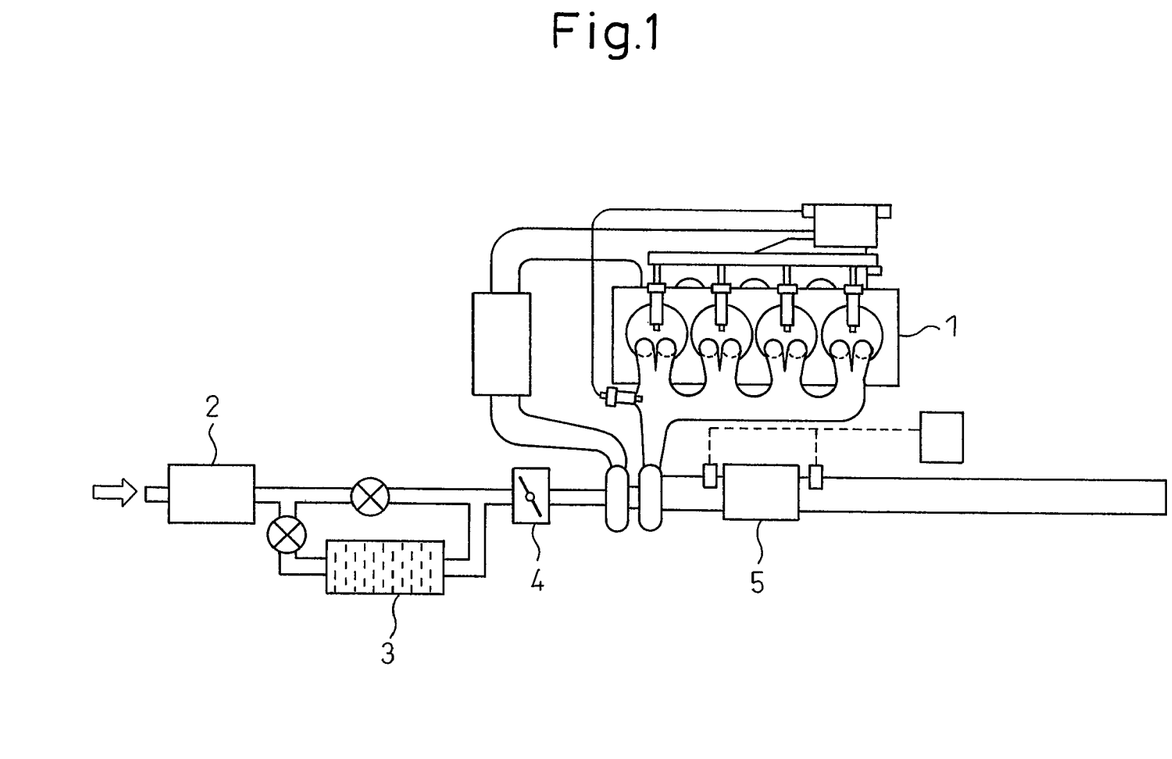
FIG. 1 is a schematic view illustrating the constitution of an embodiment of when the invention is applied to a device for purifying exhaust gas of an internal combustion engine.

FIG. 1 illustrates an embodiment in which the embodiment of FIG. 2 is further provided with a by-pass for by-passing the HEPA filter 3, and valve means is provided to control the change-over of the flow of the intake air into the HEPA filter 3 and the flow of the intake air into the by-pass. That is, when the intake air does not have to be passed through the HEPA filter 3 depending upon the operating conditions of the internal combustion engine, the intake air is introduced into the internal combustion engine 1 without passing through the HEPA filter 3. When the intake air must be passed through the HEPA filter 3, the intake air is introduced into the internal combustion engine passing through the HEPA filter 3. By controlling the change-over as described above, it is allowed to prevent a decrease in the operation efficiency of the internal combustion engine caused by an increased pressure loss of the intake air due to the HEPA filter 3. In this case, the intake air is passed more often through the by-pass than through the HEPA filter 3 over the whole operation time. Therefore, as shown in FIG. 1, it is preferable to connect the by-pass to a portion that has fewer bends downstream of the ordinary air filter 2 so that the pressure loss becomes small during the operation through the by-pass.

Figure 3:
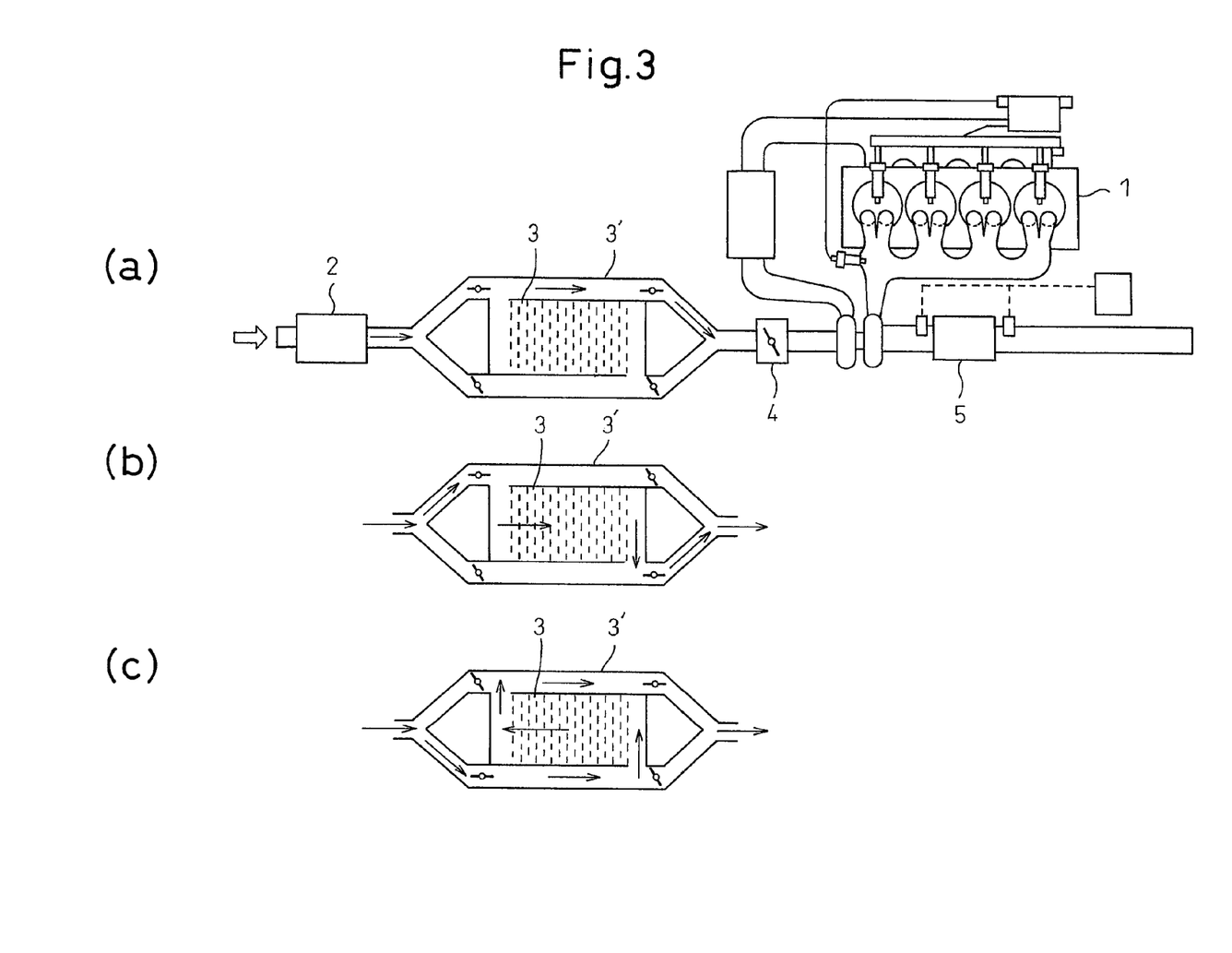
FIG. 3 is a schematic view illustrating the constitution of a further embodiment of when the invention is applied to the device for purifying exhaust gas of an internal combustion engine.

FIG. 3 illustrates an embodiment of a HEPA filter change-over passage 3' combining the intake air passage, HEPA filter and valve means provided for the embodiment of FIG. 1, enabling the intake air to be so changed over as to flow backward to the upstream of the HEPA filter 3 from the downstream of the HEPA filter 3. That is, when the PM is not formed depending on the operating conditions of the internal combustion engine, the flow of the air through the HEPA filter 3 is reversed to blow off fine nano-sized particles deposited on the HEPA filter 3, and therefore preventing a decrease in the performance of the HEPA filter 3. That is, FIG. 3(*a*) illustrates a state in which when the number of PM particles in the exhaust gas is smaller than a reference value even without passing the intake air through the HEPA filter 3, the air passing through the ordinary air filter 2 is permitted to flow by-passing the HEPA filter 3. FIG. 3(*b*) illustrates a state where the intake air is passed through the HEPA filter 3 to remove fine particles of nano-sizes that serve as nuclei of PM from the intake air. FIG. 3(*c*) illustrates a state where the flow of the air through the HEPA filter 3 is reversed to conduct the operation for cleaning the HEPA filter 3 under an operating condition in which no PM has been emitted into the exhaust gas. That is, the operations of FIGS. 3(*a*) and 3(*b*) are the same as those of the embodiment of FIG. 1. However, in this embodiment, the operation is conducted for reverse cleaning as shown in FIG. 3(*c*) so that the HEPA filter 3 maintains the filtering performance for extended periods of time.

Figure 4:
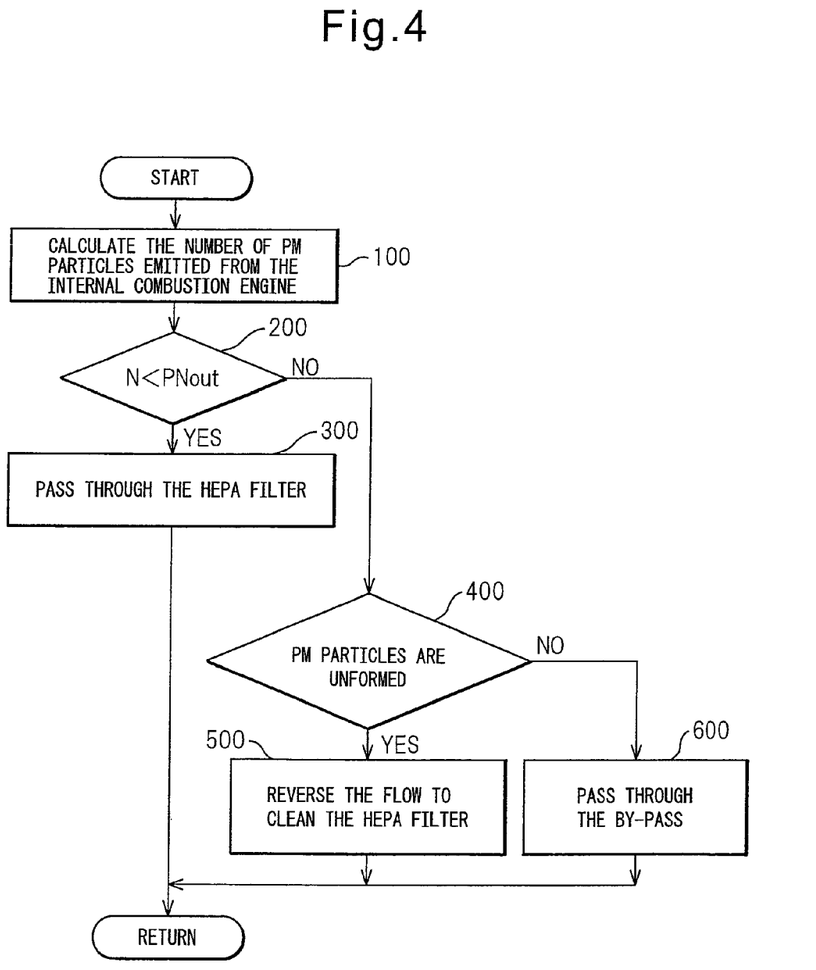
FIG. 4 is a flowchart illustrating the control of the embodiment of FIG. 3.

FIG. 4 is a flowchart of control for changing over the operating conditions of FIGS. 3(*a*), 3(*b*) and 3(*c*). The control device incorporates a map showing relations among the operating conditions of the internal combustion engine, number of PM particles emitted from the internal combustion engine and PM trapping efficiency of the DPF. Upon the start of control, first, at step 100, the number of PM particles emitted from the internal combustion engine and the PM trapping efficiency of the DPF are obtained from the map, based on the present operating condition of the internal combustion engine, and the number of PM particles (PNout) emitted to the open air is calculated. Next, at step 200, the number of PM particles (PNout) is compared with a preset reference number of PM particles (N). When PNout exceeds N, the routine proceeds to step 300 where the operation of FIG. 3(*b*) is conducted to pass through the HEPA filter 3. When PNout is smaller than N, on the other hand, the routine proceeds to step 400. However, depending upon the operating conditions, PM is not quite formed. Therefore, it is, decided on the map if the operating condition is the one that forms no PM or is the one that forms PM. If the operating condition is the one that forms no PM, the routine proceeds to step 500 where the operation of FIG. 3(*c*) is conducted to reversely flow to clean the HEPA filter 3 and to blow off PM particles trapped by the HEPA filter 3. On the other hand, when the number of PM particles (PNout) emitted to the open air is smaller than the reference number of PM particles (N) but the condition is the one that forms PM, the routine proceeds to step 600 to conduct the operation of FIG. 3(*a*) of not to pass through the HEPA filter 3.

At step 100 in FIG. 4, the number of PM particles emitted depending upon the operating conditions is calculated. When the calculated number of PM particles exceeds a predetermined value, the fluid is so controlled at step 200 as to pass through the high efficiency filter. However, a correlation between the operating conditions and the number of the emitted PM particles may be found in advance by experiments and may be held, for example, as an operation map. At step 100, the number of the emitted PM particles may be found from the operation map. When the operating condition is such that the number of the emitted PM particles exceeds a predetermined value, the fluid may be so controlled at step 200 as to flow through the high efficiency filter. Such an operating condition may be, for example, the operation when the load of operation is low. Under such operating condition, it is advantageous if the fluid is controlled so as to pass through the high efficiency filter.

Figure 8:
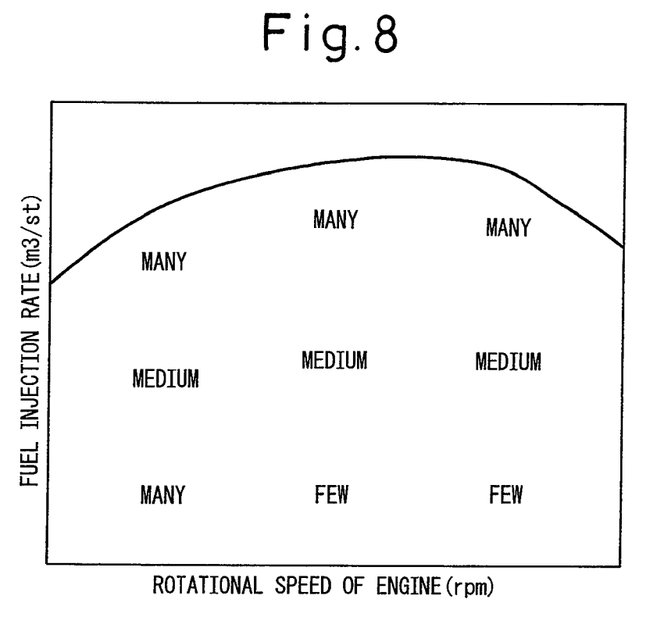
FIG. 8 is a diagram illustrating one example of an operation map of control of when the invention is applied to the device for purifying exhaust gas of an internal combustion engine.

FIG. 8 is an example of an operation map that is used at the above step 100 of finding the number of PM particles, and shows a distribution of the numbers of PM particles emitted per second, wherein the abscissa represents the rotational speed of the engine per minute and the ordinate represents the amount of fuel injection per stroke in cubic meters. By using the operation map, the number of the PM particles (PNout) emitted to the exterior can be estimated based on the present operating condition of the internal combustion engine.

Figure 9:
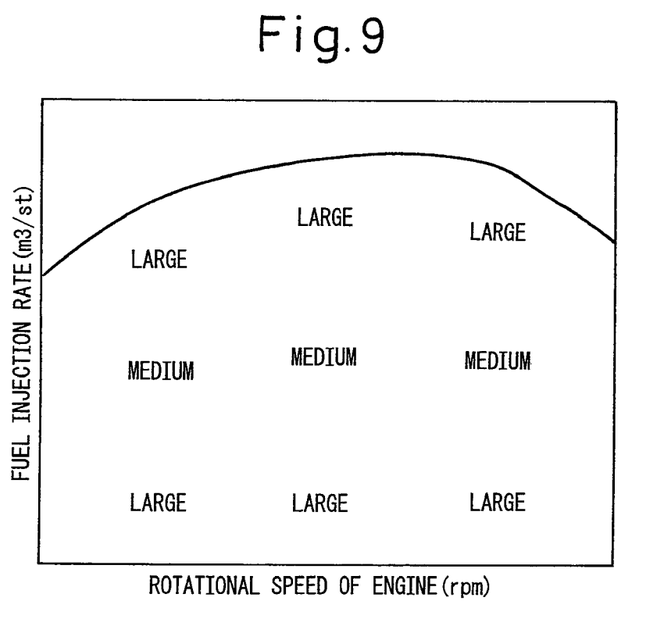
FIG. 9 is a diagram illustrating another example of an operation map of control of when the invention is applied to the device for purifying exhaust gas of an internal combustion engine.

FIG. 9 is an example of an operation map that is used at the above step 400 of deciding if the operating condition is the one that forms no PM or is the one that forms PM, and shows a distribution of PM particle formation sensitivities influenced by nano-sized particles in the intake air, wherein the abscissa represents the rotational speed of the engine per minute and the ordinate represents the amount of fuel injection per stroke in cubic meters. By using the operation map, the routine can be decided if it should go to step 500 or step 600.

Figure 5:
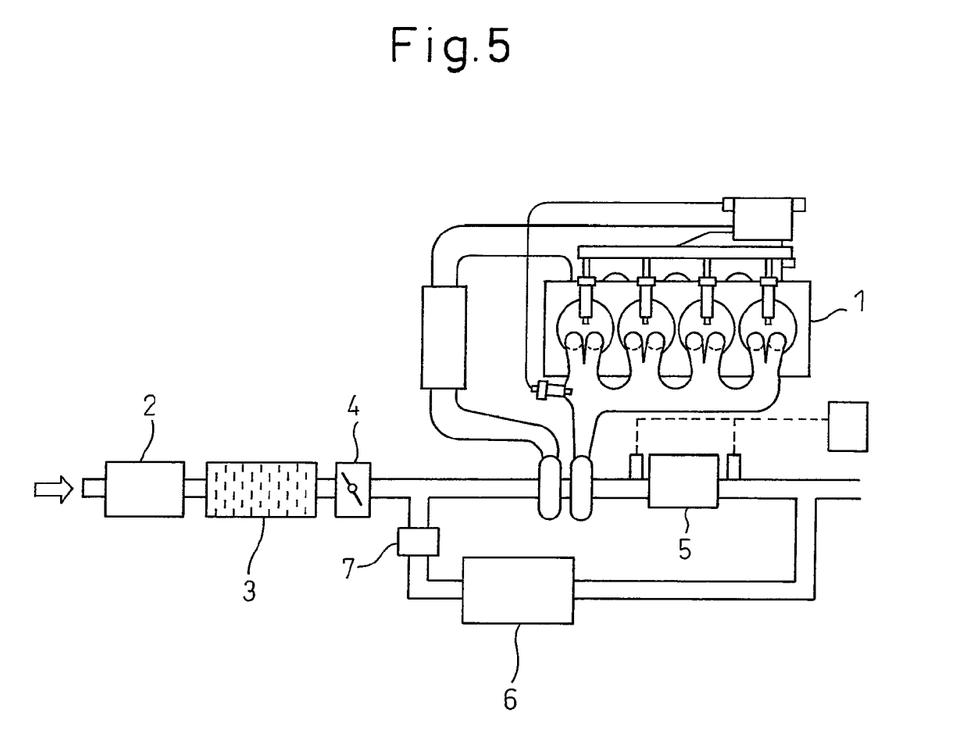
FIG. 5 is a schematic view illustrating the constitution of a still further embodiment of when the invention is applied to the device for purifying exhaust gas of an internal combustion engine.

FIG. 5 illustrates an embodiment of when the embodiment of FIG. 2 is applied to the internal combustion engine equipped with an LPL-EGR (low-pressure-loop exhaust gas recirculating device). When the LPL-EGR is also used, the number of the PM particles is decreasing in the EGR. Therefore, greatly decreasing fine particles in the air that enters into the combustion chamber of the internal combustion engine is possible.

Figure 6:
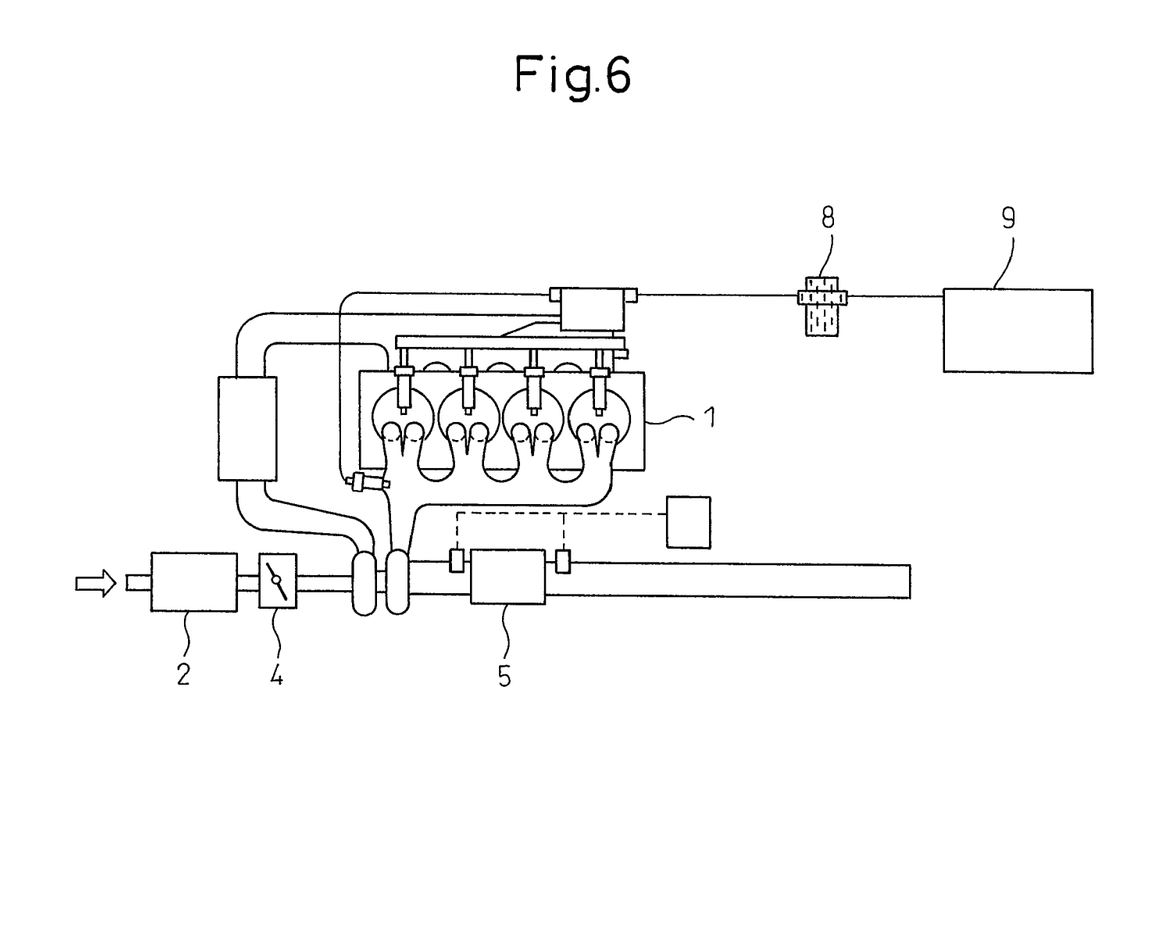
FIG. 6 is a schematic view illustrating the constitution of a yet further embodiment of when the invention is applied to the device for purifying exhaust gas of an internal combustion engine.

FIG. 6 illustrates a yet further embodiment of the present invention in which a high efficiency filter 8 for removing particles of nano-sizes is arranged in a passage for feeding fuel to the internal combustion engine 1. That is, to decrease the PM that generates in the combustion chamber of the internal combustion engine 1, fine particles of nano-sizes that serve as nuclei for forming PM are removed from the fuel by the high efficiency filter 8. In this case, it is preferable to remove relatively large solid matters that may hinder the mechanical motion of the internal combustion engine by using an ordinary fuel filter 10 (see FIG. 7) before the fuel flows into the high efficiency filter 8, letting the high efficiency filter 8 to remove the particles of nano-sizes only so that filtering performance of the high efficiency filter 8 is not hindered.

Figure 7:
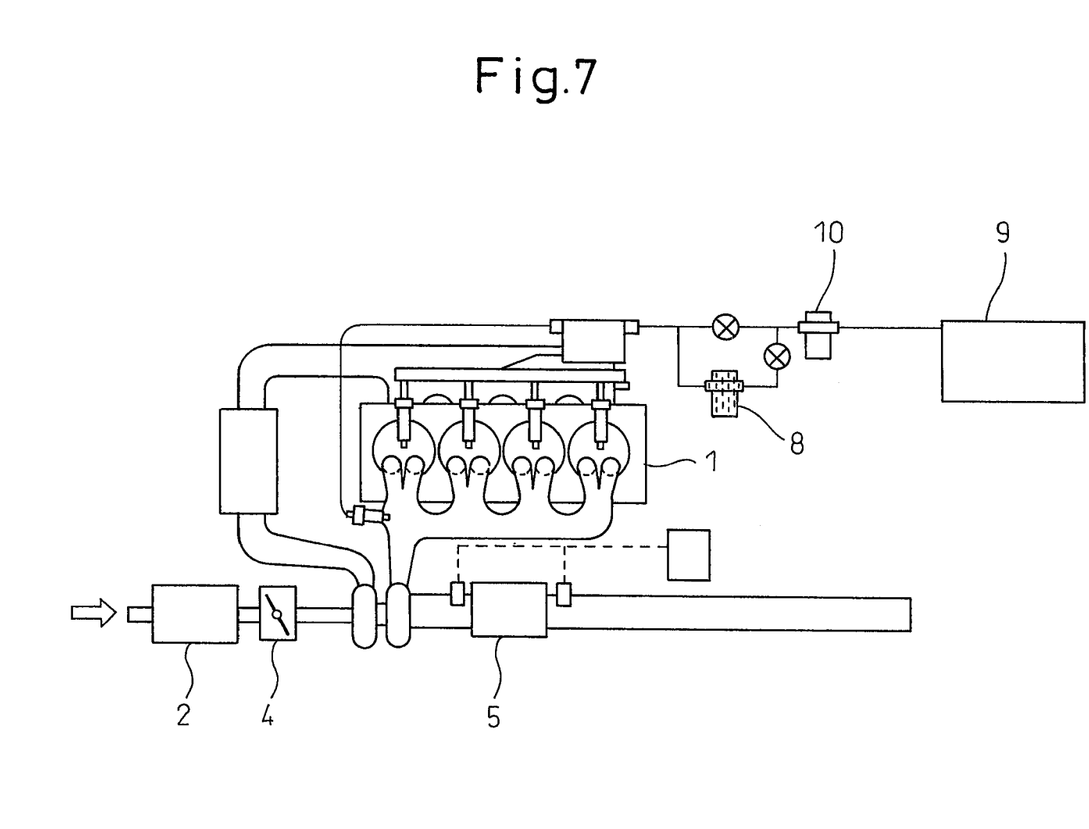
FIG. 7 is a schematic view illustrating the constitution of a further embodiment of when the invention is applied to the device for purifying exhaust gas of an internal combustion engine.

FIG. 7 illustrates a further embodiment of when the embodiment of FIG. 6 is provided with a by-pass for by-passing the high efficiency filter 8, and with valve means for controlling the change-over of the flow of fluid into the high efficiency filter 8 and the flow of fluid into the by-pass. That is, when the fuel does not have to be passed through the high efficiency filter 8 depending upon the operating conditions of the internal combustion engine, the fuel is introduced into the internal combustion engine 1 without passing through the high efficiency filter 8. The fuel is introduced into the internal combustion engine passing through the high efficiency filter 8 only when it is necessary to pass the fuel through the high efficiency filter 8. By thus changing over the flow, it is allowed to prevent an increase in the loss of fluid pressure and to prevent a decrease in the operation efficiency of the internal combustion engine during the whole operation time. In this case, the fuel is passed more often through the by-pass than through the high efficiency filter 8 over the whole operation time. Therefore, as shown in FIG. 1, it is preferable to connect the by-pass to a portion that has fewer bends downstream of the ordinary fuel filter 10 so that the pressure loss becomes small during the operation through the by-pass.

That is, the high efficiency filter 8 is installed in the fuel system in a basic manner like the HEPA filter 3 installed in the intake air system. Therefore, in the high efficiency filter 8 in the fuel system, the fuel passage, high efficiency filter and valve means may also be combined together to control the change-over of flow of fuel so as to reversely clean like the case of the above-mentioned HEPA filter 3 shown in FIG. 3. The control flowchart, too, may be constituted in the same manner as that of FIG. 4.

For all the fluids fed into the combustion chamber of the internal combustion engines, there can be applied the device constitution utilizing the high efficiency filter and the control operation that were described above without departing from the scope of the present invention. A further fluid to be fed into the combustion chamber of the internal combustion engine may be, for example, engine oil.

REFERENCE SIGNS LIST

1 internal combustion engine
2 ordinary air filter
3 high efficiency filter
3' passage for changing over the high efficiency filter
4 throttle valve
5 DPF
6 EGR cooler
7 EGR valve
8 high efficiency filter
9 fuel tank
10 ordinary fuel filter

The invention claimed is:

1. A device for purifying exhaust gas of an internal combustion engine, comprising:
   at least one high efficiency filter arranged in at least one passage for feeding at least one fluid into a combustion chamber to remove fine particles smaller than 50 nanometers that serve as nuclei for forming PM,
   wherein said fine particles smaller than 50 nanometers are removed to decrease the number of PM particles emitted from the internal combustion engine;
   at least one by-pass that by-passes said at least one high efficiency filter;
   valve means for controlling a change-over of the flow of the fluid into said at least one high efficiency filter, the flow of the fluid into said at least one by-pass and the flow of the fluid backward through said at least one high efficiency filter; and
   a control device including control logic for calculating the number of the emitted PM particles depending upon the operating conditions of the internal combustion engine to control the fluid; wherein when the calculated number of the PM particles exceeds a predetermined value, the fluid is controlled to pass through said high efficiency filter; when the calculated number of the PM particles is smaller than the predetermined value, the control device determines if PM is formed based upon the operating conditions; wherein when the PM is formed, the fluid is controlled to pass through said by-pass, and when the PM is not formed, the fluid is controlled to flow backward through said high efficiency filter to clean said high efficiency filter.

2. The device for purifying exhaust gas of an internal combustion engine according to claim 1, wherein said operating conditions where it is calculated that the number of the PM particles exceeds the predetermined value are light-load operating conditions.

3. The device for purifying exhaust gas of an internal combustion engine according to claim 1, wherein said at least one high efficiency filter is arranged downstream of an ordinary filter.

4. A device for purifying exhaust gas of an internal combustion engine, comprising:
   at least one high efficiency filter arranged in at least one passage for feeding at least one fluid into a combustion chamber to remove fine particles smaller than 50 nanometers that serve as nuclei for forming PM,
   wherein said fine particles smaller than 50 nanometers are removed to decrease the number of PM particles emitted from the internal combustion engine;
   at least one by-pass that by-passes said at least one high efficiency filter;
   valve means for controlling a change-over of the flow of the fluid into said at least one high efficiency filter, the flow of the fluid into said at least one by-pass and the flow of the fluid backward through said at least one high efficiency filter; and
   a control device including control logic for estimating the number of the emitted PM particles depending upon the operating conditions of the internal combustion engine to control the fluid; wherein when the estimated number of the PM particles exceeds a predetermined value, the fluid is controlled to pass through said high efficiency filter;
   under the operating conditions where it is estimated that the number of the PM particles emitted from the internal combustion engine is smaller than the predetermined value, it is decided if the operating conditions are for forming the PM;
   when the PM is formed, the fluid is controlled to pass through said by-pass; and
   when the PM is not formed, the fluid is controlled to flow backward through said high efficiency filter to clean said high efficiency filter.

5. The device for purifying exhaust gas of an internal combustion engine according to claim 4, wherein said operating conditions where it is estimated that the number of the PM particles exceeds the predetermined value are light-load operating conditions.

6. The device for purifying exhaust gas of an internal combustion engine according to claim 4, wherein said at least one high efficiency filter is arranged downstream of an ordinary filter.

* * * * *